(12) United States Patent
Hughes et al.

(10) Patent No.: US 11,334,176 B2
(45) Date of Patent: May 17, 2022

(54) ULTRATHIN TOUCHPAD WITH LIGHTGUIDE

(71) Applicant: Dell Products L.P., Round Rock, TX (US)

(72) Inventors: Charles Dennis Hughes, Round Rock, TX (US); Mark Andrew Schwager, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/024,036

(22) Filed: Sep. 17, 2020

(65) Prior Publication Data

US 2022/0083161 A1    Mar. 17, 2022

(51) Int. Cl.
*G06F 3/0354* (2013.01)
*G06F 3/0482* (2013.01)
*G06F 3/04883* (2022.01)
*F21V 8/00* (2006.01)
*G06F 3/038* (2013.01)

(52) U.S. Cl.
CPC ....... *G06F 3/03547* (2013.01); *G02B 6/0035* (2013.01); *G02B 6/0088* (2013.01); *G06F 3/038* (2013.01); *G06F 3/0482* (2013.01); *G06F 3/04883* (2013.01); *G06F 2203/04103* (2013.01)

(58) Field of Classification Search
CPC .... G06F 3/03547; G06F 3/038; G06F 3/0482; G06F 3/04883; G06F 2203/04103; G02B 6/0035; G02B 6/0088
See application file for complete search history.

(56) References Cited

U.S. PATENT DOCUMENTS

| | | | |
|---|---|---|---|
| 11,216,091 B2 * | 1/2022 | Ho | G06F 3/03547 |
| 2004/0012940 A1 * | 1/2004 | Kim | H05K 7/1454 |
| | | | 361/801 |
| 2009/0180244 A1 * | 7/2009 | Kiyohara | G02F 1/13338 |
| | | | 361/679.01 |
| 2010/0302190 A1 * | 12/2010 | Yeh | A63F 13/2145 |
| | | | 345/173 |
| 2014/0027161 A1 * | 1/2014 | Lee | H05K 3/20 |
| | | | 174/257 |
| 2014/0145836 A1 * | 5/2014 | Tossavainen | G06F 3/016 |
| | | | 340/407.2 |
| 2020/0348774 A1 * | 11/2020 | Hsu | G06F 3/03547 |

* cited by examiner

Primary Examiner — Stephen G Sherman
(74) Attorney, Agent, or Firm — Baker Botts L.L.P.

(57) ABSTRACT

A touchpad assembly for an information handling system allows a user to select and switch between using the touchpad assembly as a touchpad to drag, drop, scroll and select items on a display and using the touchpad assembly as a numerical keypad to enter data for processing by the information handling system.

19 Claims, 3 Drawing Sheets

ULTRATHIN TOUCHPAD WITH LIGHTGUIDE

BACKGROUND

Field of the Disclosure

This disclosure relates generally to information handling systems and, more particularly, to ultrathin touchpads with lightguide layers selectively configurable by a user to operate as a touchpad or a numerical keypad (numpad).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments disclosed herein may be generally directed to touchpad assemblies selectively configurable by a user to operate as a touchpad or a numerical keypad (numpad). A touchpad assembly comprises a glass layer, a lightguide layer and a printed control board (PCB), wherein the layers and couplings between the layers are selected to provide a stiffness and resistance to shear bending.

Embodiments disclosed herein may be generally directed to information handling systems with touchpad assemblies selectively configurable by a user to operate as a touchpad or a numerical keypad (numpad).

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
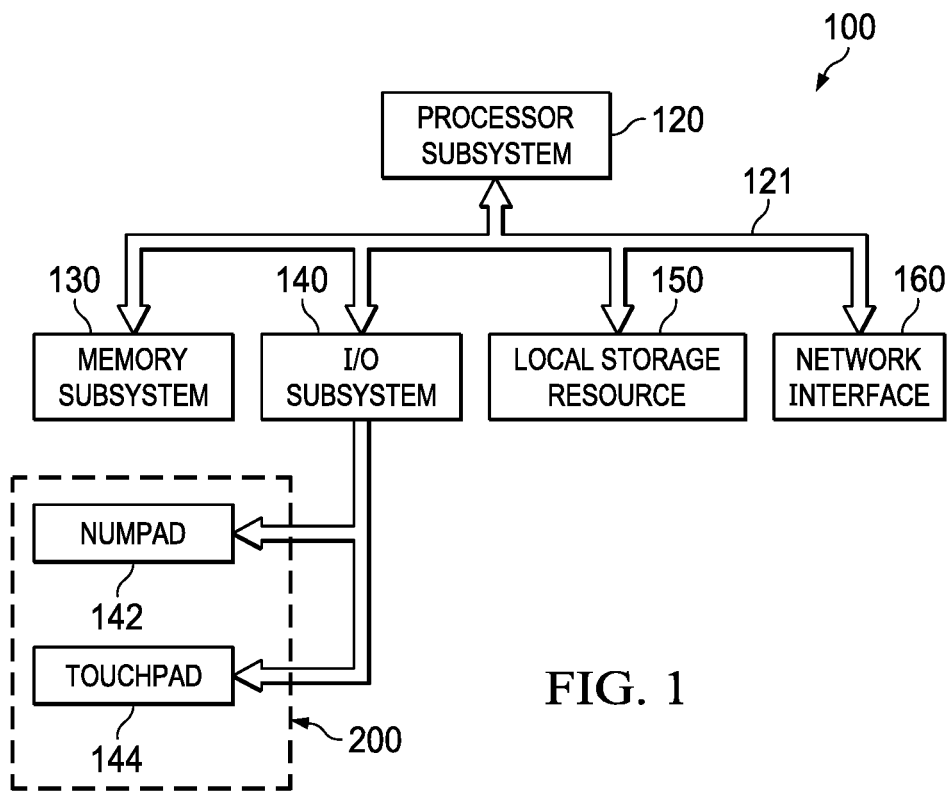
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, element "310-1" refers to an instance of an element, which may be referred to collectively as elements "310" and any one of which may be referred to generically as an element "310."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

A user may want an information handling system with a touchpad assembly for receiving user input and may want the information handling system to also include a numerical pad (numpad) assembly for receiving user input. However, the presence of a touchpad and a numpad increases the size of an information handling system, particularly laptops and other portable devices.

Embodiments disclosed herein include a touchpad assembly configured to operate as a touchpad and as a numpad, wherein the touchpad assembly may be selectively configurable by a user to operate as a touchpad or a numpad.

Embodiments disclosed herein are described with respect to portable information handling systems. Particular embodiments are best understood by reference to FIGS. 1-2, 3A-3B, and 4-5, wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140, local storage resource 150, and a network interface 160.

Processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

System bus 121 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard including numerical keypad (numpad) 142, touchpad 144, or a camera, among other examples. In some implementations, I/O subsystem 140 may support so-called 'plug and play' connectivity to external devices, in which the external devices may be added or removed while information handling system 100 is operating. I/O subsystem 140 may include touchpad assembly 200 selectively configurable by a user to operate as numpad 142 or touchpad 144, discussed in greater detail below.

Local storage resource 150 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 160 may be a suitable system, apparatus, or device operable to serve as an interface between information handling system 100 and a network (not shown). Network interface 160 may enable information handling system 100 to communicate over a network using a suitable transmission protocol or standard. In some embodiments, network interface 160 may be communicatively coupled via a network to a network storage resource (not shown). A network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 160 or various components associated therewith may be implemented using hardware, software, or any combination thereof.

A user may want to interact with information handling system 100. Touchpad assembly 200 may be configured to operate as touchpad 144 or numpad 142.

Figure 2:
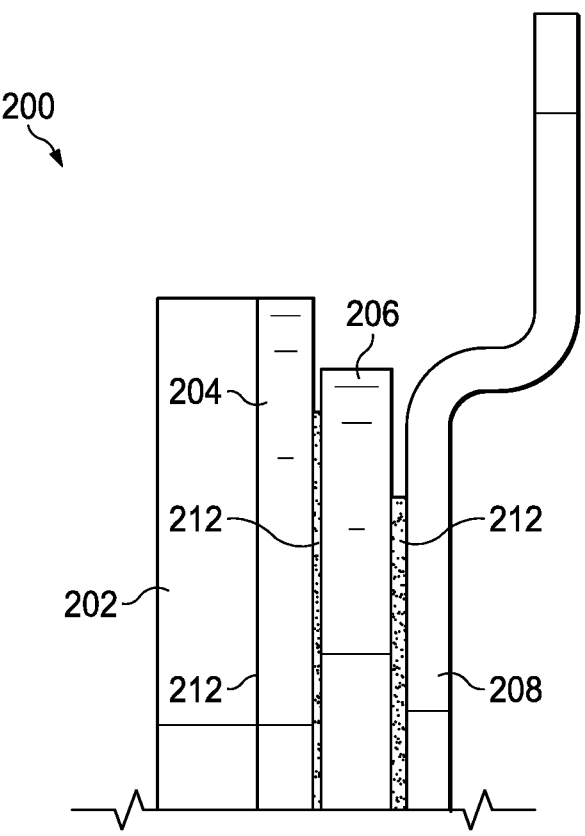
FIG. 2 is a partial cross-section view of one embodiment of a touchpad assembly for use with the information handling system of FIG. 1.

FIG. 2 depicts a cutaway view of one embodiment of touchpad assembly 200 for use in information handling system 100 as numpad 142 or touchpad 144. Touchpad assembly 200 comprises glass layer 202 for contact by a user, lightguide layer 204 and PCB 206. In some embodiments, touchpad assembly 200 may include bracket 208.

Touchpad assembly 200 may be configured as touchpad 144 to receive user input associated with the user wanting to manipulate items visible on a display screen, including scrolling and dragging or dropping items on the display screen. Scrolling may include moving one or more fingers up or down relative to glass layer 202 while maintaining the one or more fingers in contact with glass layer 202. Dragging may include selecting an item on a display screen and moving one or more fingers across glass layer 202 while maintaining the one or more fingers in contact with glass layer 202 to reposition the element on the display screen. Dropping may include releasing an item on the display screen by applying a force on glass layer 202 using one or more fingers and removing the one or more fingers from contact with glass layer 202. Selecting an item may include "left-clicking" or "right-clicking". Although not visible in FIG. 2, "left-click" may refer to a user applying a force to a lower left portion of glass layer 202 to input a first user selection associated with an item, and "right-click" may refer to a user applying a force to a lower right portion of glass layer 202 to input a second user selection associated with the item.

Glass layer 202 may be formed from a material having a surface finish for contact by a user and high mechanical stiffness to allow PCB 206 to detect and distinguish user inputs while minimizing a thickness of glass layer 202. In some embodiments, glass layer 202 may be formed with high strength glass. For example, sapphire glass refers to a type of glass and Gorilla glass, manufactured by Corning Inc., are examples of high strength glass that may be used to form glass layer 202.

Figure 3A:
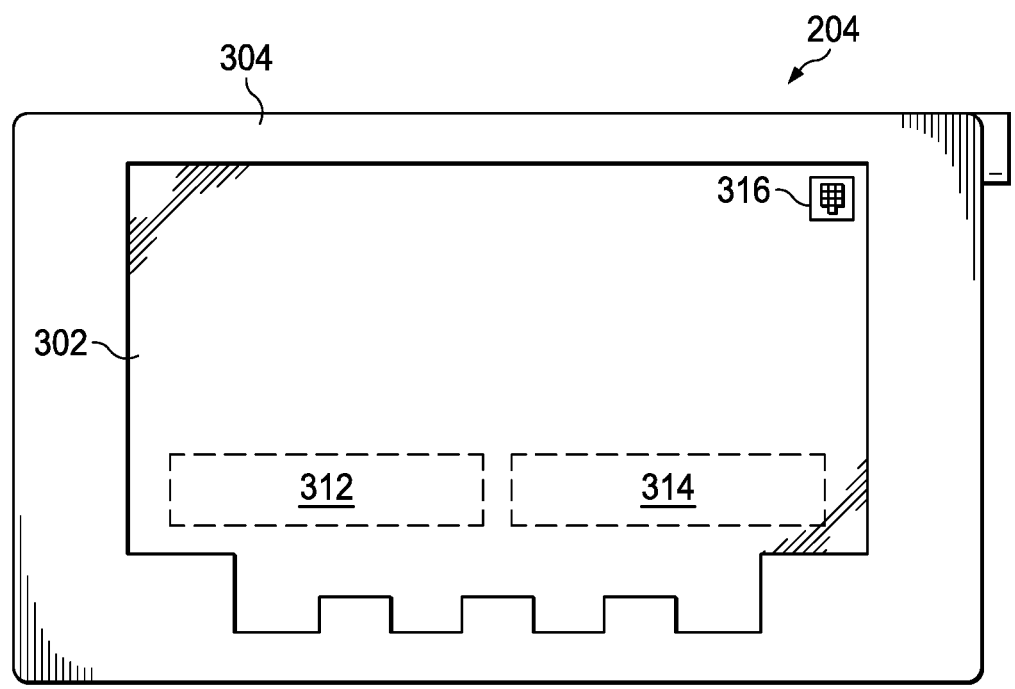
FIG. 3A is a top view of a lightguide layer emitting light to display a touchpad display according to one embodiment of the touchpad assembly of FIG. 2.
Figure 3B:
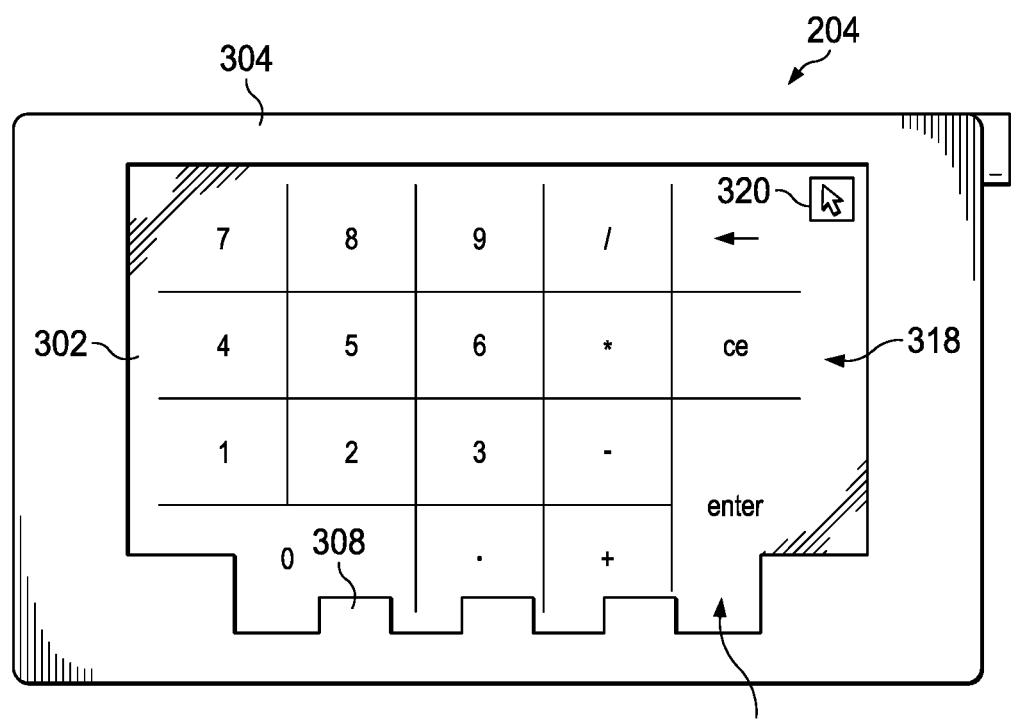
FIG. 3B is a top view of a lightguide layer emitting light to display a numpad display according to one embodiment of the touchpad assembly of FIG. 2.

Referring to FIGS. 2 and 3A-3B, lightguide layer 204 comprises a thin panel formed from a transparent material such as polymethyl methacrylate (PMMA). A light source positioned on one or more edges of the panel emits light intended to pass through the panel toward an opposite edge, wherein shapes formed in the panel direct the light out central display area 302 to display a graphic. In some embodiments, shapes may be formed by material removal, such as by etching or cutting, or may be formed by material deposition, such as by printing using a diffusive ink. In some embodiments, lightguide layer 204 may be configured to display a first graphic when no light is emitted and configured with shapes to display a second graphic when light is emitted.

Referring to FIG. 3A, in some configurations, when touchpad assembly 200 is functioning as touchpad 144, lightguide layer 204 may be configured to display a first graphic associated with touchpad 144. In some embodiments, when touchpad assembly 200 is operating as touchpad 144 and lightguide layer 204, central display area 302 does not display a graphic. In some embodiments, lightguide layer 204 may be configured to not emit light when touchpad assembly 200 is functioning as touchpad 144. In some embodiments, lightguide layer 204 may contain a graphic relative to central display area 302 or blocking frame 304 that is visible only when no light is emitted. For example, lightguide layer 204 may comprise a panel with a dark surface and a light-colored graphic may be printed on the top surface such that the graphic is displayed at all times but visible only when no light is transmitted through lightguide layer 204. In some embodiments, central display area 302 may display one or more graphics including left button graphic 312 in a lower left area of central display area 302 associated with a left button and lower right graphic 314 in a lower right area of central display area 302 associated with a right button and icon 316. In some embodiments, lightguide layer 204 may indicate when touchpad assembly 200 is functioning as touchpad 144. In some embodiments, lightguide layer 204 may include icon 316 indicating a location on touchpad assembly 200 where a user can touch to switch operation of touchpad assembly 200 from touchpad 144 to numpad 142. In some embodiments, icon 316 on central display area 302 may depict a graphic representation of a numpad, wherein a user clicking on icon 316 causes information handling system 100 to switch operation of touchpad assembly 200 to numpad 142 and emit light to display a graphic associated with touchpad assembly 200 functioning as numpad 142, wherein icon 316 is not visible when touchpad assembly 200 is functioning as numpad 142.

Referring to FIG. 3B, in some configurations, when touchpad assembly 200 is functioning as numpad 142, lightguide layer 204 may be configured to display a graphic associated with touchpad assembly 200 functioning as numpad 142. In some embodiments, lightguide layer 204 may be configured to emit light indicating when touchpad assembly 200 is functioning as numpad 142. In some embodiments, lightguide layer 204 may be formed with shapes corresponding to lines, numbers and letters such that, when light is emitted by lightguide layer 204, central display area 302 displays a graphic representation of a numpad associated with touchpad assembly 200 functioning as numpad 142. In some embodiments, lightguide layer 204 may be formed with shapes corresponding to lines, numbers and letters, wherein when light is emitted by lightguide layer 204, central display area 302 displays a graphic representation of a numpad associated with touchpad assembly 200 functioning as numpad 142 including a plurality of selectable items 318 such as numbers (0-9), an addition (+) key, a subtraction (-) key, a multiplication (*) key, a division (/) key, an "Enter" key and a "Delete" key. In some embodiments, lightguide layer 204 depicts icon 320 indicating an area on touchpad assembly 200 where a user may touch to switch operation of touchpad assembly 200 from numpad 142 to touchpad 144. For example, in some embodiments, icon 320 on central display area 302 may depict a graphic associated with touchpad 144, wherein a user clicking on icon 320 causes lightguide layer 204 to stop emitting light and causes touchpad assembly 200 to switch operation from numpad 142 to touchpad 144.

In some embodiments, graphics (e.g., icons 316 and 320) may be co-located on central display area 302 such that a first graphic (e.g., icon 316) is visible when no light is transmitted through lightguide layer 204 and a second graphic (e.g., icon 320) is visible when light is transmitted through lightguide layer 204.

In some embodiments, blocking frame 304 and central display area 302 may overlap. In some embodiments, blocking frame 304 may be configured with cutouts 306 or tabs 308, wherein the size and position of cutouts 306 or tabs 308 on blocking frame 304 may provide greater stiffness of lightguide layer 204. In some embodiments, blocking frame 304 comprises a thermoplastic material. In some embodiments, blocking frame 304 comprises glass filled polycarbonate (PC) or polyphenylsulfide (PPS).

Figure 4:
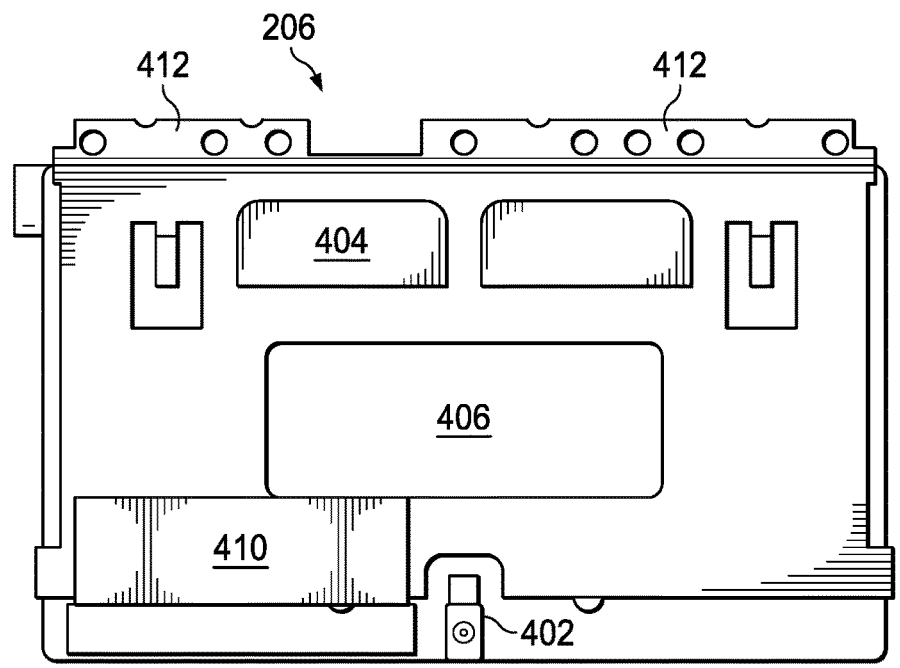
FIG. 4 is a top view of a PCB according to one embodiment of the touchpad assembly of FIG. 2.

Referring to FIGS. 1, 2 and 4, in some embodiments, PCB 206 comprises components configured to receive a set of signals and determine a user input based on the set of signals. For example, PCB 206 may comprise switch 402 for contact with lightguide layer 204 and may contain a memory medium 404 storing a set of instructions executable by PCB processor 406 to receive a signal from switch 402 and determine a user is applying a force to glass layer 202.

In some embodiments, PCB 206 comprises PCB tabs 412 for coupling PCB 206 to a chassis containing information handling system 100. In some embodiments, PCB tabs 412 allow for some degree of deflection, discussed in greater detail below.

In some embodiments, PCB 206 or selected areas or portions of PCB 206 may be stiffened by applying material to area 410. For example, PCB 206 may be stiffened by applying material to area 410. Graphene sheets and graphite fibers are examples of materials that may be applied to a printed circuit board such as PCB 206 to stiffen PCB 206. Graphene sheets and graphite fibers both have a low density of approximately 1.8 g/cc, which minimizes the weight added to PCB 206 and a portable device with embodiments described herein. In some embodiments or configurations, graphene may be preferred due to a small minimum bend radius (e.g., less than 1 mm) and a low elastic modulus (approximately 50 GPa), and graphene does not typically fracture. Graphene also has a high thermal conductivity (approximately 1700 W/m K) and a high thermal conductivity to density ratio (approximately 944), which may contribute to more efficient cooling of PCB 206 in some chassis or configurations. Other materials with a low density, a high thermal conductivity, a high thermal conductivity to density ratio, a low elastic modulus, a small minimum bend radius and/or a low susceptibility to fractures may also be used to stiffen PCB 206.

Referring to FIGS. 1, 2, 3A and 4, when touchpad assembly 200 is configured as touchpad 144, lightguide layer 204 may emit light associated with touchpad 144 and PCB processor 406 may process user input as a touchpad input. For example, PCB processor 406 may receive a signal from switch 402 and determine that a user is applying a force to a lower left portion of glass layer 202 associated with lower left area 312 displayed in central display area 302 of lightguide layer 204 and determine the user is inputting a "left-click" input. Similarly, PCB processor 406 may receive a signal from switch 402 and determine that the user is applying a force to a lower right portion of glass layer 202 associated with lower right area 314 displayed in central display area 302 of lightguide layer 204 and determine the user is inputting a "right-click" input. Similarly, PCB processor 406 may receive a signal from switch 402 and determine that the user is dragging one or more fingers across a top surface of glass layer 202 associated with central display area 302 of lightguide layer 204 and determine the user input is associated with scrolling or dragging.

Referring to FIGS. 1, 2, 3B and 4, when touchpad assembly 200 is configured as numpad 142, lightguide layer 204 may emit light associated with numpad 142 and PCB processor 406 may determine that the user is applying a force to one of a plurality of selectable items 318 displayed in central display area 302 of lightguide layer 204. PCB processor 406 may receive the user input and communicate the user input to processor subsystem 120.

Figure 5:
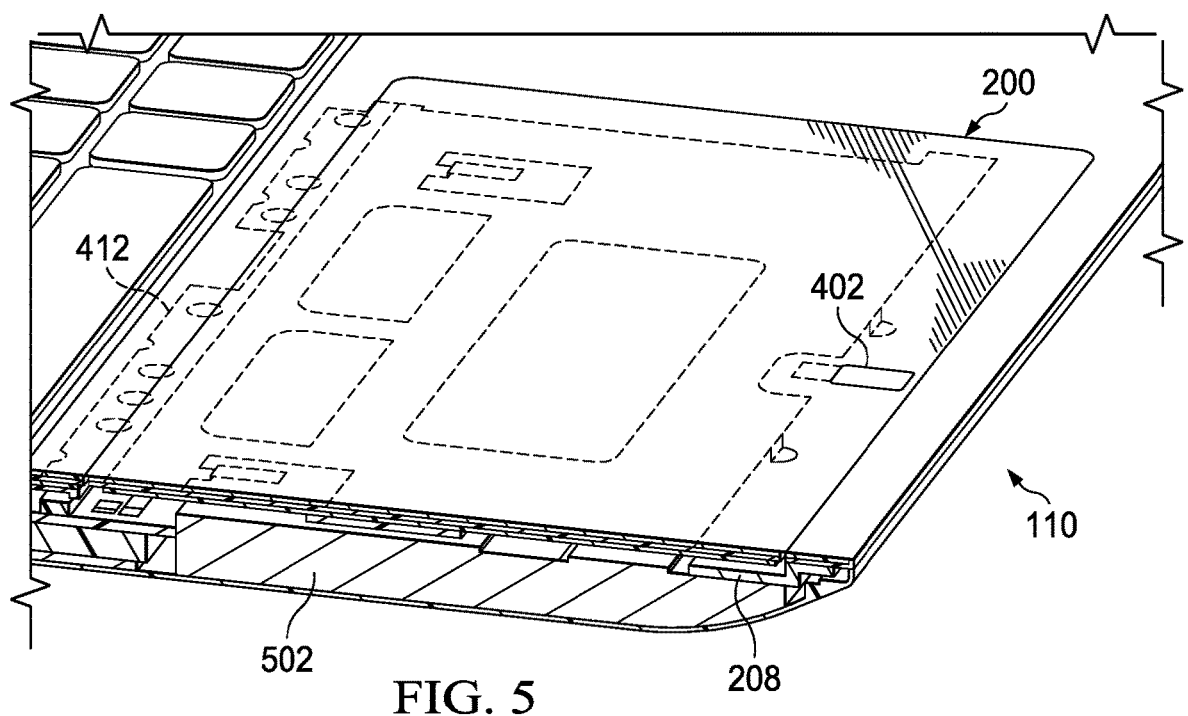
FIG. 5 is a partial perspective view of a chassis for the embodiment of an information handling system of FIG. 1 with one embodiment of the touchpad assembly of FIG. 2.

Referring to FIG. 5, touchpad assembly 200 may be positioned in chassis 110 of information handling system 100 near battery 502. To minimize an overall thickness of chassis 110 while maintaining or increasing a charge capacity of battery 502, embodiments of touchpad assembly 200 may be configured with minimal thickness. In some embodiments, touchpad assembly 200 may be configured to have an overall thickness approximately equal to 2.05 mm.

In some embodiments, one or more PCB tabs 412 may couple touchpad assembly 200 to chassis 110, wherein touchpad assembly 200 is deflectable about PCB tabs 412. In some embodiments, switch 402 is configured to detect a deflection of touchpad assembly 200 or lightguide layer 204 relative to PCB tabs 412 and communicate a signal to PCB processor 406 based on the deflection.

Each of glass layer 202, lightguide layer 204 and PCB 206 may provide stiffness to touchpad assembly 200. In some embodiments, structural adhesive 212 may be applied between one or more of glass layer 202 and lightguide layer 204, lightguide layer 204 and PCB 206, and PCB 206 and bracket 208. Structural adhesive 212 may be more effective than using a pressure sensitive adhesive for preventing shear movement in bending in touchpad assembly 200 while enabling PCB processor 406 to execute touch sensing algorithms associated with numpad 142 and touchpad 144. In some embodiments, touchpad assembly 200 formed with glass layer 20, lightguide layer 204 and PCB 206 may be made thinner but the use of structural adhesive 212 may enable switch 402 to detect a small deflection of touchpad assembly 200 or lightguide layer 204 relative to PCB tabs 412 such that PCB processor 406 can determine a user input based on the deflection.

Referring to FIGS. 2, 4 and 5, in some embodiments, bracket 208 may provide additional support and rigidity to touchpad assembly 200. In some embodiments, surface mount technology (SMT) may be used to couple bracket 208 with PCB 206. SMT may eliminate shear effect in bending such that touchpad assembly 200 has a high mechanical stiffness. A high mechanical stiffness allows PCB processor 406 to detect user inputs using switch 402 and to distinguish between user inputs. In some embodiments, at least a portion of bracket 208 overlaps at least a portion of area 410. In some embodiments, solder may couple bracket 208 to PCB 206.

Embodiments of information handling systems 100 described herein maintain minimal thickness of chassis 110 for greater available space for battery 502 while providing numpad 142 and touchpad 144 functionality for improved user experience.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A touchpad assembly, comprising:
   a glass layer for contact by a user;
   a lightguide layer configured to emit light, the lightguide layer coupled to the glass layer; and
   a printed control board (PCB) coupled to the lightguide layer, the PCB comprising:
      a switch in contact with the lightguide layer;
      a PCB processor; and
      a memory medium storing a set of instructions executable by the PCB processor to:
         receive a first user input;
         communicate with the lightguide layer to display, based on the first user input, a first graphic associated with the touchpad assembly when the touchpad is configured for use as a touchpad and a second graphic associated with the touchpad assembly when the touchpad is configured for use as a numerical keypad (numpad);
         receive a second user input, wherein:
            when the touchpad assembly is configured as the touchpad, i) the PCB processor is configured to process the second user input as a touchpad input, and ii) the lightguide layer is configured to not emit light such that the first graphic is visible; and
            when the touchpad assembly is configured as the numpad, the PCB processor is configured to process the second user input as a numpad input, and ii) the lightguide layer is configured to emit light such that the second graphic is visible.

2. The touchpad assembly of claim 1, wherein:
   the PCB processor is further configured to:
      receive the second user input; and
      interpret the second user input as one of a left-click gesture, a right-click gesture, and a drag gesture.

3. The touchpad assembly of claim 1, wherein:
   when the touchpad assembly is configured as the numpad, the lightguide layer is configured to emit light to display the second graphic comprising a plurality of selectable items, each selectable item associated with a number or a mathematic operator; and
   the PCB processor is further configured to:
      receive the second user input; and
      communicate the second user input to a processor for processing as a number or a mathematic operator.

4. The touchpad assembly of claim 1, wherein the lightguide layer comprises a blocking frame.

5. The touchpad assembly of claim 4, wherein the blocking frame comprises glass filled polycarbonate (PC) or polyphenylsulfide (PPS).

6. The touchpad assembly of claim 4, wherein the blocking frame comprises at least one of a cutout and an internal tab.

7. The touchpad assembly of claim 1, wherein the PCB comprises graphene material over a portion of the printed control board.

8. The touchpad assembly of claim 7, wherein:
the touchpad assembly comprises a bracket coupled to the PCB; and
at least a portion of the bracket overlaps at least a portion of the graphene material.

9. The touchpad assembly of claim 8, further comprising adhesive between one or more of the lightguide layer and the glass layer, the PCB and the lightguide layer, and the bracket and the PCB.

10. An information handling system, comprising:
a processor subsystem;
a screen display; and
a touchpad assembly comprising:
a glass layer configured for contact by a user;
a lightguide layer configured to emit light, the lightguide layer coupled to the glass layer; and
a printed control board (PCB) coupled to the lightguide layer, the PCB comprising:
a PCB processor; and
a memory medium storing a set of instructions executable by the PCB processor to:
receive a first user input;
communicate with the lightguide layer to display, based on the first user input, a first graphic associated with the touchpad assembly when the touchpad is configured for use as a touchpad and a second graphic associated with the touchpad assembly when the touchpad is configured for use as a numerical keypad (numpad);
receive a second user input, wherein:
when the touchpad assembly is configured as the touchpad, i) the PCB processor is configured to process the second user input as a touchpad input, and ii) the lightguide layer is configured to not emit light such that the first graphic is visible; and
when the touchpad assembly is configured as the numpad, the PCB processor is configured to process the second user input as a numpad input, and ii) the lightguide layer is configured to emit light such that the second graphic is visible.

11. The information handling system of claim 10, wherein:
the PCB processor is further configured to:
receive the second user input; and
interpret the second user input as one of a left-click gesture, a right-click gesture, and a drag gesture.

12. The information handling system of claim 11, wherein the lightguide layer comprises a blocking frame.

13. The information handling system of claim 12, wherein the blocking frame comprises glass filled polycarbonate (PC) or polyphenylsulfide (PPS).

14. The information handling system of claim 12, wherein the blocking frame comprises at least one of a cutout and an internal tab.

15. The information handling system of claim 10, wherein:
when the touchpad assembly is configured as the numpad, the lightguide layer is configured to emit light to display the second graphic comprising a plurality of selectable items, each selectable item associated with a number or a mathematic operator; and
the PCB processor is further configured to:
receive the second user input; and
communicate the second user input to the processor subsystem for processing as a number or a mathematic operator.

16. The information handling system interface of claim 10, wherein:
the PCB comprises a PCB tab fixed to a chassis of the information handling system; and
the PCB comprises graphene material over a portion of the printed control board.

17. The information handling system of claim 16, wherein at least a portion of a bracket overlaps at least a portion of the graphene material.

18. The information handling system of claim 17, further comprising adhesive between one or more of the lightguide layer and the glass layer, the PCB and the lightguide layer, and the bracket and the PCB.

19. The information handling system of claim 10, wherein the touchpad assembly is positioned relative to a battery in a chassis of the information handling system.

* * * * *